US012749466B2

(12) United States Patent
Ooi et al.

(10) Patent No.: US 12,749,466 B2
(45) Date of Patent: Sep. 29, 2026

(54) UNIFORM FACIAL APPEARANCE IN A CAPTURED VIDEO STREAM

(71) Applicant: DELL PRODUCTS L.P., Round Rock, TX (US)

(72) Inventors: Ghee Beng Ooi, Singapore (SG); Chih-Hao Kao, Singapore (SG); Vui Khen Thien, Singapore (SG)

(73) Assignee: Dell Products L.P., Round Rock, TX (US)

(*) Notice: Subject to any disclaimer, the term of this patent is extended or adjusted under 35 U.S.C. 154(b) by 366 days.

(21) Appl. No.: 18/500,006

(22) Filed: Nov. 1, 2023

(65) Prior Publication Data

US 2025/0139937 A1 May 1, 2025

(51) Int. Cl.

| | |
|---|---|
| ***G06T 7/194*** | (2017.01) |
| ***G06F 3/04845*** | (2022.01) |
| ***G06V 10/56*** | (2022.01) |
| ***G06V 10/60*** | (2022.01) |
| ***G09G 5/10*** | (2006.01) |
| ***G09G 5/377*** | (2006.01) |

(52) U.S. Cl.

CPC .......... *G06V 10/60* (2022.01); *G06F 3/04845* (2013.01); *G06T 7/194* (2017.01); *G06V 10/56* (2022.01); *G09G 5/10* (2013.01); *G09G 5/377* (2013.01); *G09G 2320/0233* (2013.01); *G09G 2320/0626* (2013.01); *G09G 2340/04* (2013.01)

(58) Field of Classification Search

CPC ...................................................... G06V 10/10

See application file for complete search history.

(56) References Cited

U.S. PATENT DOCUMENTS

| | | | | |
|---|---|---|---|---|
| 10,109,228 | B2 * | 10/2018 | Hoffman | G09G 3/2092 |
| 11,435,875 | B2 | 9/2022 | Yong | |
| 11,705,078 | B1 | 7/2023 | Chung et al. | |
| 2015/0046823 | A1 * | 2/2015 | Didomenico | G09G 5/14<br>715/722 |
| 2021/0152876 | A1 * | 5/2021 | Feng | H04N 21/4312 |
| 2023/0206621 | A1 * | 6/2023 | Ayanoglu | H04L 12/1813<br>382/190 |
| 2025/0078870 | A1 * | 3/2025 | Lindmark | G11B 27/02 |

FOREIGN PATENT DOCUMENTS

| | | | | |
|---|---|---|---|---|
| CN | 112019926 A | * 12/2020 | | H04N 21/4402 |

* cited by examiner

*Primary Examiner* — Di Xiao

(74) *Attorney, Agent, or Firm* — Larson Newman, LLP

(57) ABSTRACT

An information handling system includes a camera and a display controller. The camera captures multiple images to form a video stream. The display controller outputs a background image pattern on a display screen. The color temperature and the brightness of the background image pattern are set to defined levels. The display controller receives the video stream from the camera. The display controller outputs the video stream as a separate stream from the background image pattern on the display screen. The luminance of the video stream is controlled independent from the color temperature and brightness of the background image pattern.

17 Claims, 6 Drawing Sheets

UNIFORM FACIAL APPEARANCE IN A CAPTURED VIDEO STREAM

FIELD OF THE DISCLOSURE

The present disclosure generally relates to information handling systems, and more particularly relates to providing a uniform facial appearance in a captured video stream.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a camera and a display controller. The camera captures multiple images to form a video stream. The display controller may output a background image pattern on a display screen. The color temperature and the brightness of the background image pattern may be set to defined levels. The display controller may receive the video stream from the camera. The display controller may output the video stream as a separate stream from the background image pattern on the display screen. The luminance of the video stream may be controlled independent from the color temperature and brightness of the background image pattern.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
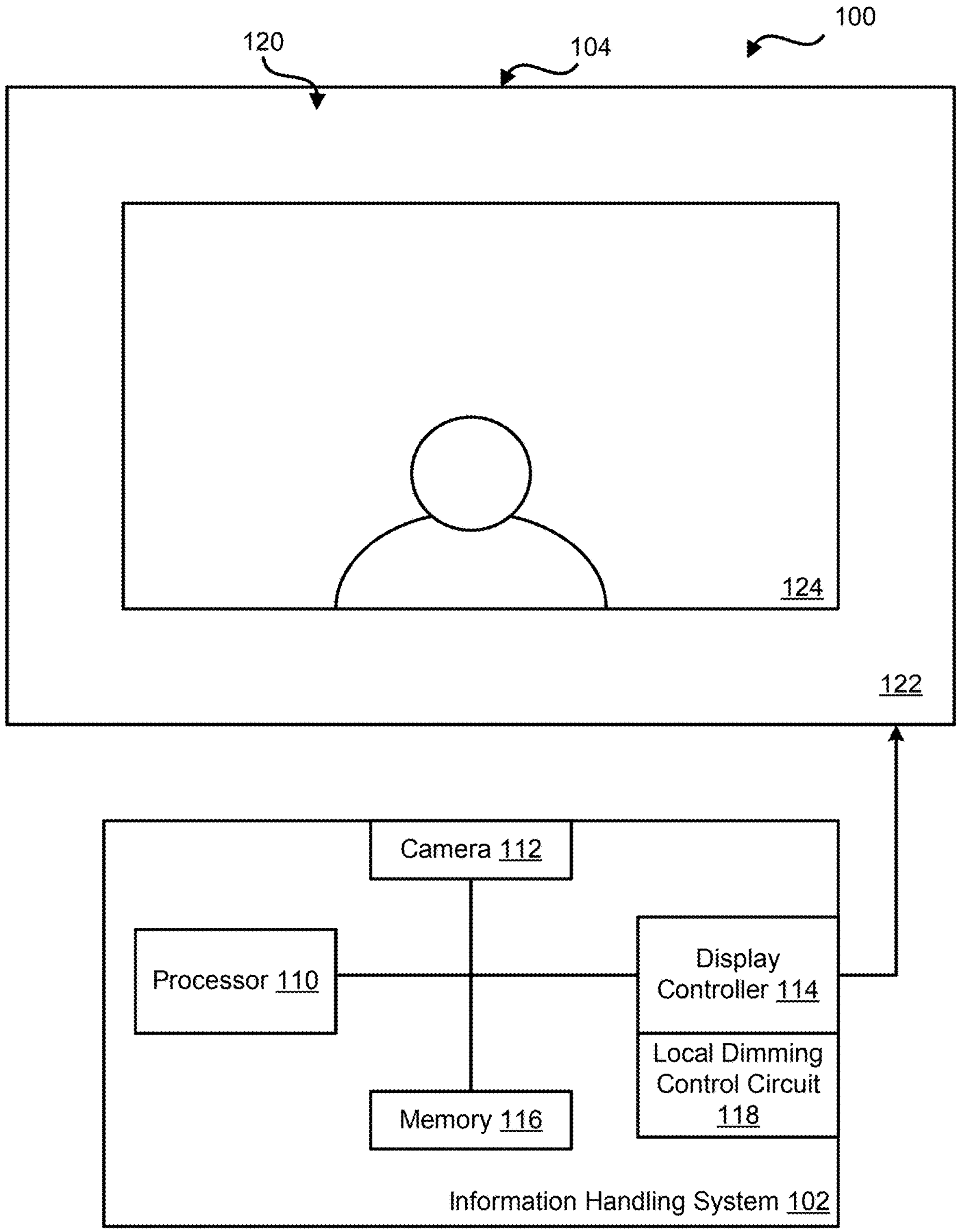
FIG. 1 is a block diagram of a portion of a system including an information handling system and a display according to at least one embodiment of the present disclosure.
Figure 2:
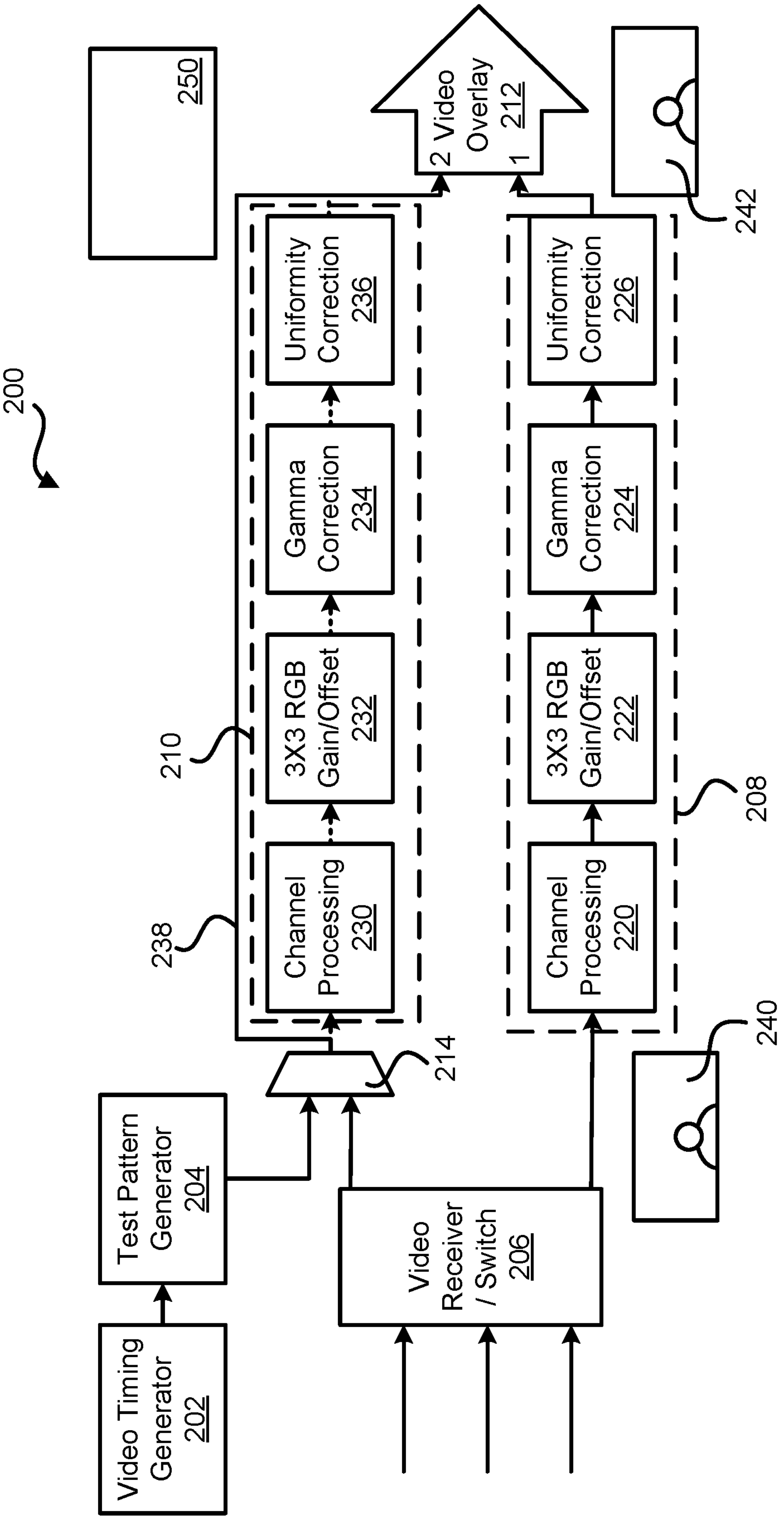
FIG. 2 is a block diagram of display controller according to at least one embodiment of the present disclosure.

FIGS. 1 and 2 illustrate a portion of a system 100 including an information handling system 102 and a display device 104 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 102 includes a processor 110, a camera 112, a display controller 114, a memory 116, and a local dimming control 118. Display device 104 includes screen 120, which in turn may be utilized to output a background image pattern 122 and a video stream 124. In an example, local dimming control 118 may be located within display device 104 without varying from the scope of this disclosure. Information handling system 102 may communicate with display device 104 via display controller 114. Information handling system 102 may include additional components without varying from the scope of this disclosure.

In certain situations, an individual associated with information handling system 102 may record his or herself with camera 112 to create a video stream. In an example, the video stream may be utilized for any suitable function, such as for a video conference or the like. The experience of the individual during the creation of the video stream may be affected by multiple different factors including, but not limited to, the individual's facial appearance and the quality of the video stream. The facial appearance of the individual may be affected by different conditions, such as shadows, lighting conditions, or the like. The recording and streaming of a video stream may be improved in information handling system 102 by providing background image pattern 122 on display device 104, which in turn may adjust or add lighting to obtain optimal facial appearance of the individual within video stream 124.

In an example, information handling system 102, via display controller 114, may combine the video stream with a background lighting to provide a dual channel output to display device 104. In this example, background image pattern 122 may be a main channel or stream of the dual channel output and video stream 124 may be a secondary channel or stream of the dual channel output. The secondary channel may be a picture-in-picture (PIP) channel of the output on screen 120. In an example, the luminance of background image pattern 122 and video stream 124 may be independently controlled as will be described with respect to FIGS. 2-6 below.

FIG. 2 illustrates a display controller 200 according to at least one embodiment of the present disclosure. Display controller 200 may be substantially similar to display controller 114. Display controller 200 includes a video timing generator 202, a test pattern generator 204, a video receiver/switch 206, channel video processing paths 208 and 210, video overlay circuitry 212, and a multiplexor 214. Channel video processing path 208 includes a channel processing component 220, a red/green/blue (RGB) gain/offset component 222, a gamma correction component 224, and a uniformity correction component 226. Channel video processing path 210 includes a channel processing component 230, a RGB gain/offset component 232, a gamma correction component 234, and a uniformity correction component 236. Display controller 200 further includes a bypassed video path 238.

During operation of display controller 200 video receiver/switch 206 may receive one or more video inputs, such as a video stream from camera 112 of FIG. 1, and provide the video inputs to channel video processing path 208 or 210. In an example, a video stream 240 may be received by video receiver/switch 206 and the video stream may be provided to channel video processing path 208. Components 220, 222, 224, and 226 of channel video processing path 208 may perform one or more operations to adjust video stream 240 into video stream 242. For example, channel processing component 220 may adjust the size of video stream 240 based on a user defined video size setting, such as a video size setting 302 in FIG. 3. In certain examples, channel processing component 220 may utilize the user defined video size setting to scale the video stream 240 to a particular percentage of its original size and set a location of the video stream on the screen of the display device. In an example, video stream 242 may be substantially similar to video stream 124 of FIG. 1 and background image pattern 250 may be substantially similar to background image pattern 122 of FIG. 1.

Video timing generator 202 and test pattern generator 204 may combine to create a background image pattern 250. In certain examples, video timing generator 202 may be any suitable timing-based video resolution generator, such as a 4*k* resolution, a high definition (HD) resolution, or the like. In an example, test pattern generator 204 may generate a programmable RGB pattern based on user defined parameters, such as a user ring color temperature setting 308 in FIG. 3. Based on the user ring color temperature setting, test pattern generator 204 set a color temperature for background image pattern 250. Test pattern generator 204 may provide background image pattern 250 to multiplexor 214, which in turn may provide the background image pattern along bypassed video path 238 to video overlay output 212 while in the bypassed mode. In an example, background image pattern 250 may bypass components 230, 232, 234, 236 of channel video processing path 210 to prevent luminance reduction within the background image pattern that may be caused by processing of the image by any of the components.

While bypassed video path 238 is illustrated in FIG. 2 as bypassing all components 230, 232, 234, 236 of channel video processing path 210, background image pattern 250 may not always bypass all of the components. For example, in the bypassed mode, gamma correction component 234 may perform one or more operations on background image pattern 250 to maximize light output in the background image pattern.

In an example, video overlay output 212 may combine, in any suitable manner, background image pattern 250 and video stream 242 into a single output with two different channels or streams. For example, video overlay output 212 may overlay video stream 242 as a PIP video within background image pattern 250. In this example, the combined output of background image pattern 250 and PIP video stream 242 may be provided to screen 120 of display device 104 in FIG. 1.

Figure 3:
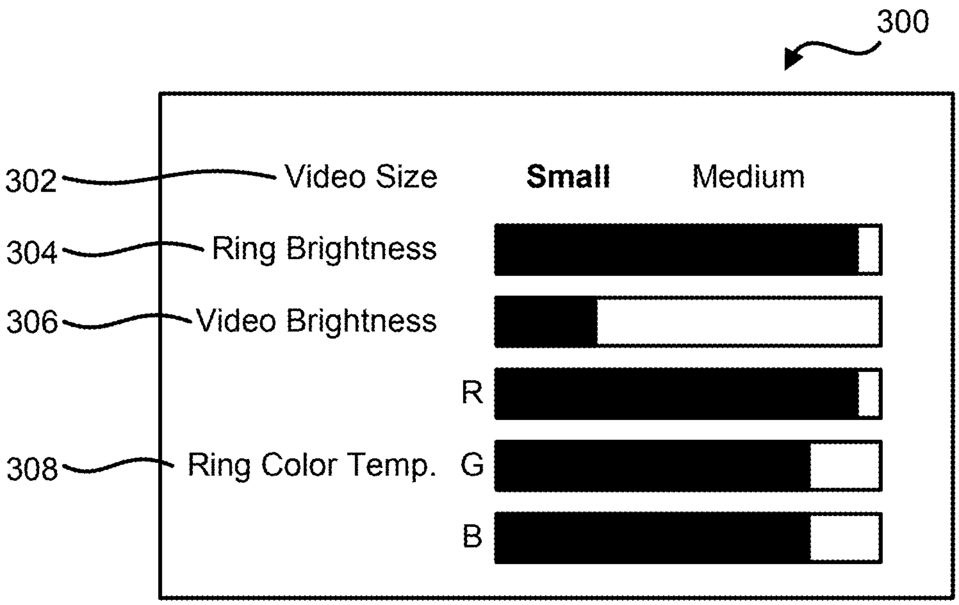
FIG. 3 is a diagram of a graphical user interface for setting display characteristics for images on a display device according to at least one embodiment of the present disclosure.

FIG. 3 illustrates a graphical user interface (GUI) 300 for setting display characteristics of images on a display device according to at least one embodiment of the present disclosure. In an example, GUI 300 may be any suitable control interface including, but not limited to, a monitor on screen display (OSD) interface. GUI 300 may include a video size setting 302, a ring brightness setting 304, a video brightness setting 306, and a ring color temperature setting 308. In an example, GUI 300 may be an interface of information handling system 102 and displayed on screen 120 of display device 104 in FIG. 1 and may be utilized to customize a facial illumination mode in the information handling system. GUI 300 may include additional settings without varying from the scope of this disclosure.

In an example, GUI 300 may be utilized by an individual associated with information handling system 102 of FIG. 1 to separately adjust properties of background image pattern or ring 122 and video stream 124. The individual may select from different size options of video size setting 302. For example, the individual may select either small or medium within video size setting 302 and this selected size may be utilized by display controller 200 of FIG. 2 while processing the video stream. While two size options are illustrated in FIG. 3, any suitable number of size options, user enterable sizes, or the like may be provided in GUI 300 without varying from the scope of this disclosure. Alternatively, based on information from camera 112, the video size setting may also be automatically selected by display controller 114. The information from camera 112 may include, but is not limited to, an automatic exposure level and average luminance detected in a face area of the image.

In certain examples, ring brightness setting 304 may be any selectable item to adjust and set a brightness level for the ring or background image pattern 250 of FIG. 2. Similarly, video brightness setting 306 may be any selectable item to adjust and set a brightness level for the video stream 242 of FIG. 2. A user may utilize ring color temperature setting 308 to manually adjust the balance of red, green, and blue in background image pattern or ring 250 of FIG. 2. In certain examples, values of ring brightness setting 304, video brightness setting 306, and ring color temperature setting 308 may be provided to display controller 200 of FIG. 2, which in turn may utilize the settings to adjust the properties of video stream 242 and background image pattern or ring 250.

Figure 4:
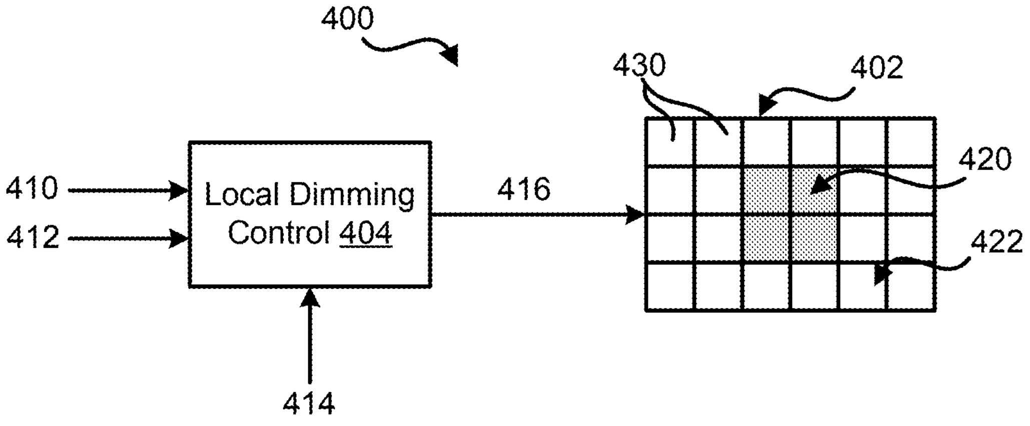
FIG. 4 is a diagram of a backlight matrix control for a display device according to at least one embodiment of the present disclosure.

FIG. 4 illustrates a backlight matrix control 400 for a display device 402 according to at least one embodiment of the present disclosure. Backlight matrix control 400 includes a local dimming control circuit 404, which may be a component of display controller 200 of FIG. 2, within processor 110 of FIG. 1, located within display device 104 of FIG. 1, or the like. Local dimming control circuit 404 includes inputs 410, 412, and 414, and an output 416. Display device 402 may provide a PIP video stream 420 and a background image pattern or ring 422. Display device 402 may be substantially similar to display device 104 of FIG. 1. PIP video stream 420 may be substantially similar to video stream 124 of FIG. 1 and 242 of FIG. 2. In an example, background image pattern or ring 422 may be substantially similar to background image pattern 122 of FIG. 1 and background image pattern or ring 250 of FIG. 2.

In an example, input 410 may receive a video stream, such as PIP video stream 420, input 412 may receive size and positional data associated with the video stream, and input 414 may receive ring brightness data and video brightness data. In certain examples, the video stream at input 410 may be received from any suitable source including, but not limited to, camera 112 of FIG. 1 and video receiver/switch 206 of FIG. 2. The size and positional data at input 412 may be received from the user selection of video size setting 302 in GUI 300 of FIG. 3. Additionally, the ring brightness data and video brightness data at input 414 may be received from user selection of ring brightness setting 304 and video brightness setting 306 in GUI 300 of FIG. 3. Local dimming control circuit 404 may utilize the data received at inputs 410, 412, and 414 to provide one or more backlight matrix control signals 416 to a backlight matrix 430 of display device 402.

In an example, backlight matrix control signals 416 may be utilized to selectively dim the luminance of a backlight matrix in areas that that video stream 420 is located and increase the areas of the backlight matrix associated with background image pattern or ring 422. For example, luminance brightness of backlight matrix associated with background image pattern 422 may be increased to a maximum luminance and the brightness of the PIP video stream 420 may be reduced.

Figure 5:
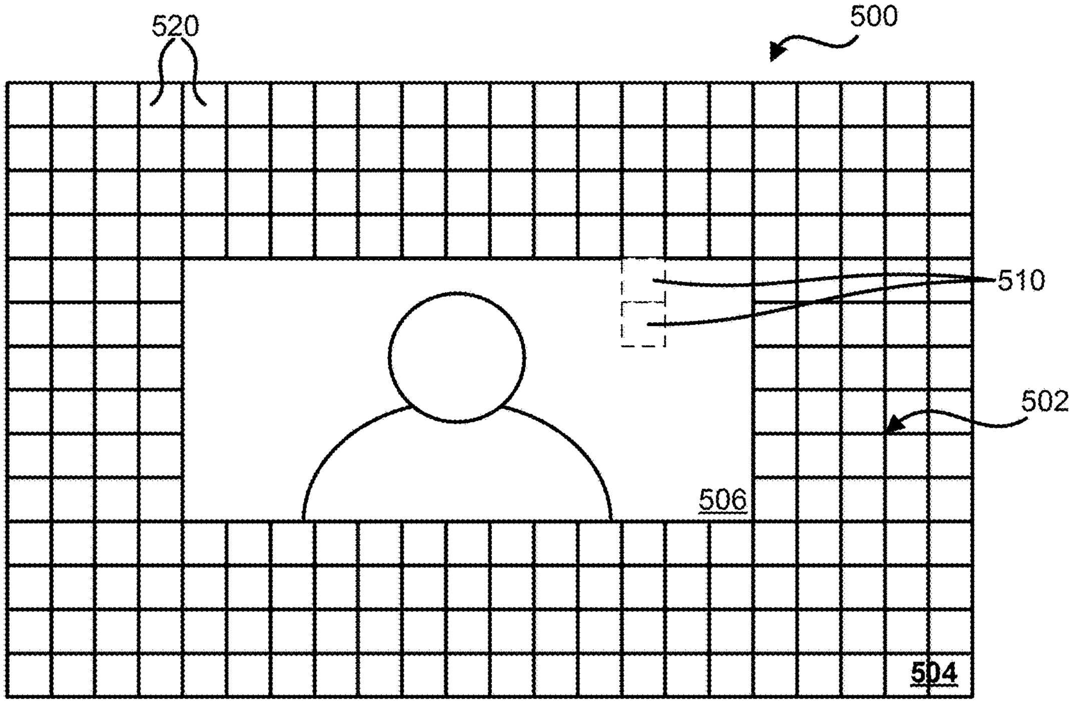
FIGS. 5 and 6 are diagrams of display devices having different backlight matrix granularities according to at least one embodiment of the present disclosure.

FIG. 5 illustrates a display device 500 having a backlight matrix granularity 502, a background image pattern ring 504, and PIP video stream 506 according to at least one embodiment of the present disclosure. Display device 500 may be substantially similar to display device 104 of FIG. 1. Backlight matrix granularity 502 includes multiple cells 510. In an example, the size of cells 510 may be set by the backlight cell grid of display device 500. In certain examples, cells 510 may be sufficiently small such that background image pattern ring 504 and PIP video stream 506 do not overlap within one or more cells. For example, no cell 510 includes portions of both background image pattern ring 504 and PIP video stream 506. In an example, edges of video stream 506 may snap or align with edges of cells 510.

In an example, PIP video stream 506 may be centered within backlight matrix 502 and a subset of cells 510 may be associated with the PIP video stream and another subset 520 of the cells may be associated with background image pattern ring 504. Each cell 510 may be independently controlled with respect to brightness, color, and hue, such that the brightness of PIP video stream 506 may be independently controlled by local dimming control circuit 404 of FIG. 4. In an example, cells 510 behind video stream 506 may be directly dimmed without affecting the luminance brightness of background image pattern ring 504. Additionally, a processor does not need to perform compensation on PIP video stream 506 because background image pattern ring 504 and the PIP video stream do not overlap. In an example, the gamma curve of background image pattern ring 504 and PIP video stream 506 may be different based on the driving strength of backlight cells 520 behind the background image pattern ring being different from the driving strength of backlight cells behind the PIP video stream.

Figure 6:
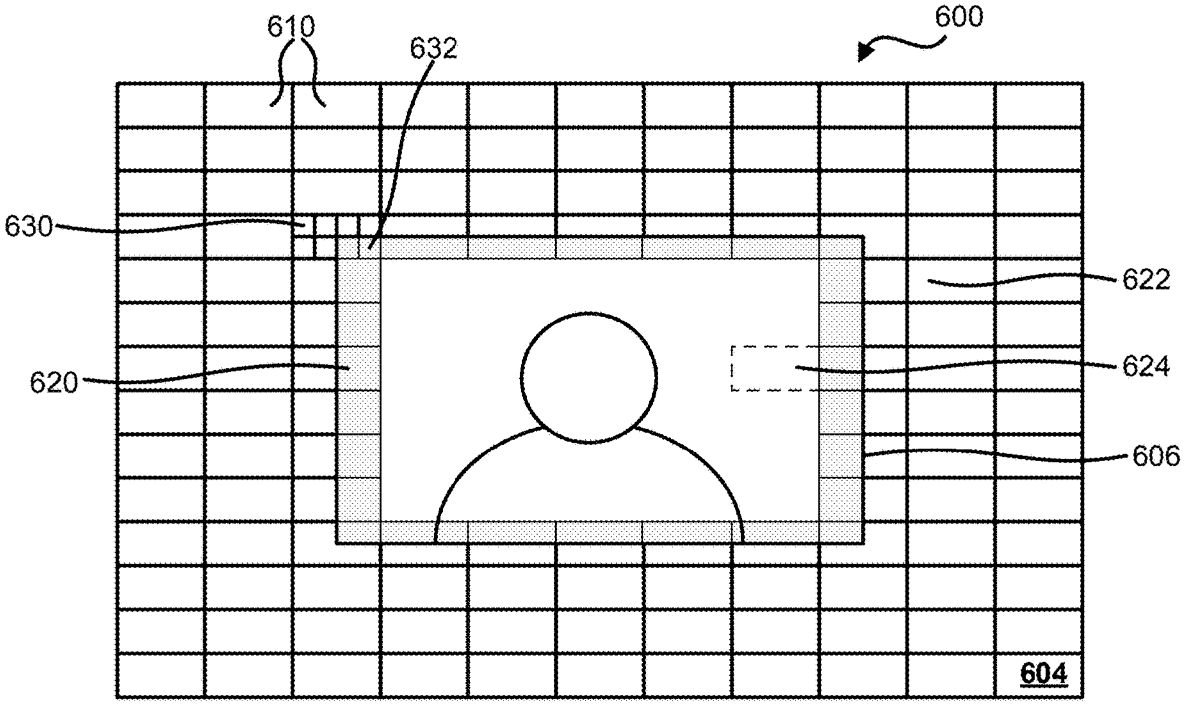

FIG. 6 illustrates a display device 600 having a backlight matrix granularity 602, a background image pattern ring 604, and PIP video stream 606 according to at least one embodiment of the present disclosure. Display device 600 may be substantially similar to display device 104 of FIG. 1. Backlight matrix granularity 602 includes multiple cells 610. In an example, the size of cells 610 may be set by the backlight cell grid of display device 600. In certain examples, the granularity of cells 610 within backlight matrix 602 may not be sufficiently small to prevent background image pattern ring 604 and PIP video stream 606 from overlapping within one or more cells. For example, each of cells 620 include portions of both background image pattern ring 604 and PIP video stream 606, each of cells 622 are located behind only background image pattern ring 604, and each of cells 624 are located behind only PIP video stream 606.

In an example, the different subsets of cells 610, such as cells 622 and 624, that do not include overlap from both background image pattern ring 604 and PIP video stream 606 may be independently controlled with respect to brightness, color, and hue, such that the brightness of background image pattern ring 604 may be independently controlled by local dimming control circuit 404 of FIG. 4. In an example, cells 624 behind video stream 606 may be directly dimmed without affecting the luminance brightness of background image pattern ring 604. In certain examples, local dimming control circuit 404 of FIG. 4 may set a uniformity compensation gain for cell 624 to 100%.

In certain examples, display controller 200 of FIG. 2, local dimming control circuit 404 of FIG. 4, or any other suitable processor, perform a uniformity compensation on overlapping cells 620. In particular, each cell 620 may be divided into smaller uniformity compensation unit cells 630 and one or more operations may be performed on these cells. For example, display controller 200 of FIG. 2 may drive the luminance brightness of cells 630 that are located behind background image pattern ring 604 to a desired brightness and then scale cells 632 behind PIP video stream 606. In certain examples, local dimming control circuit 404 of FIG.

4 may calculate a uniformity compensation gain for the cells 632. In an example, the uniformity compensation gain may be calculated based on equation 1 below:

$$\text{Uniformity compensation gain} = (L_{VideoMax} / L_{RingMax}) \times 100\% \quad \text{EQ. 1}$$

Based on equation 1 above, the luminance and uniformity compensation of cells 630 and 632 may provide a transition between cells 624 and cells 610 of the display device. In an example, the higher luminance of background image pattern ring 604 may enable a uniform appearance within video stream 606.

Figure 7:
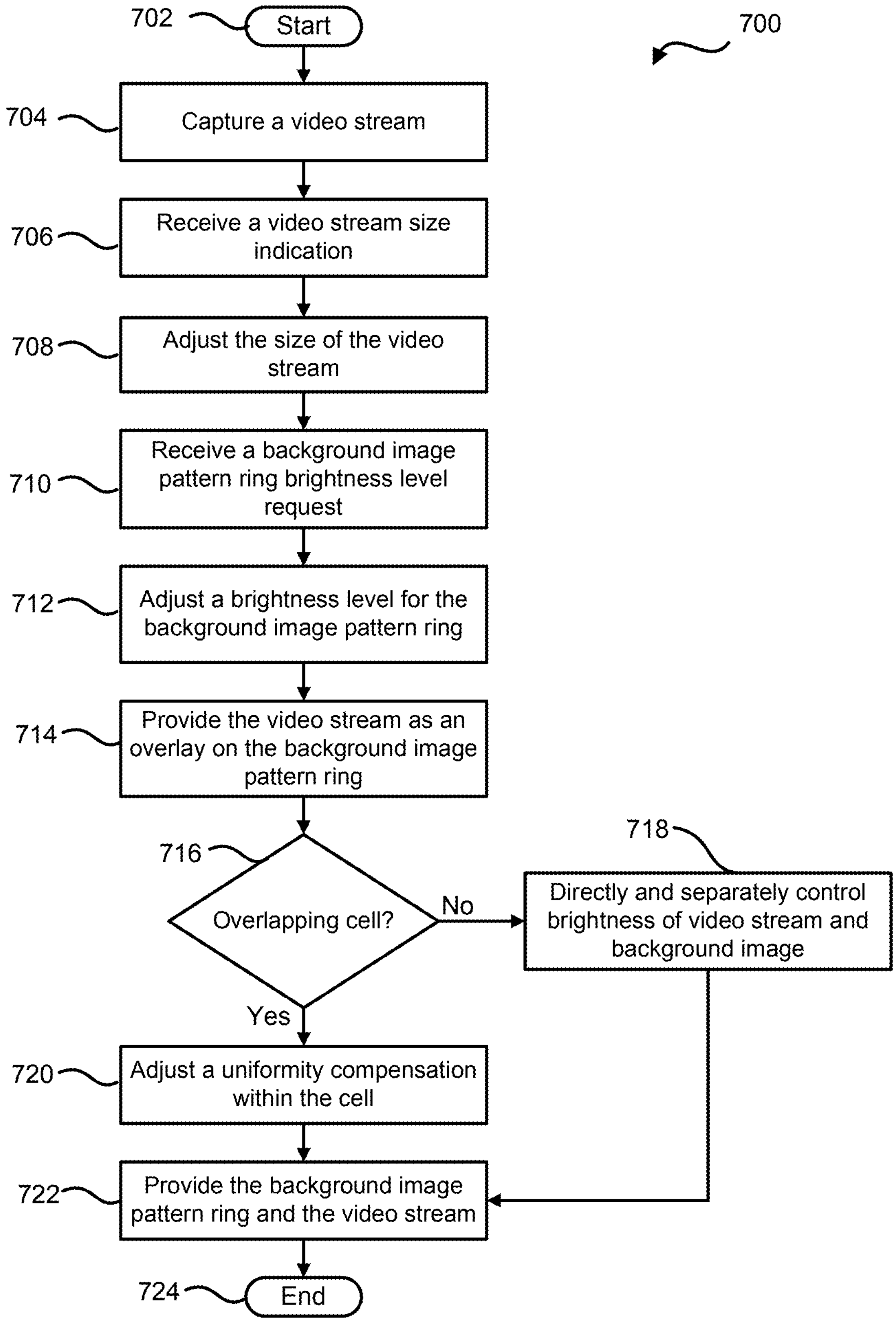
FIG. 7 is a flow diagram of a method for providing a uniform facial appearance during a video recording according to at least one embodiment of the present disclosure.

FIG. 7 is a flow diagram of a method 700 for providing a uniform facial appearance during a video recording according to at least one embodiment of the present disclosure, starting at block 702. In an example, method 700 may be performed by any suitable component including, but not limited to, camera 112 and display controller 114 of FIG. 1, and local dimming control circuit 404 of FIG. 4. It will be readily appreciated that not every method step set forth in this flow diagram is always necessary, and that certain steps of the methods may be combined, performed simultaneously, in a different order, or perhaps omitted, without varying from the scope of the disclosure.

At block 704, a video stream is captured. In an example, the video stream may be captured by a camera of the information handling system. At block 706, a video stream size indication is received. In an example, the video stream size indication may be received from a user input in a GUI. At block 708, a size of the video stream is adjusted based on the video stream size indication. In certain examples, a display controller of the information handling system may perform the size adjustment of the video stream.

At block 710, a background image pattern ring brightness level request is received. In an example, the background image pattern ring brightness level request may be received via the GUI. At block 712, the brightness level for the background image pattern ring is adjusted based on the request. At block 714, the video stream is provided as an overlay for the background image pattern ring. At block 716, a determination is made whether a cell of a background matrix includes portions of both the background image pattern ring and the video stream.

If the cell does not include portions of both the background image pattern ring and the video stream, the brightness of the background image pattern ring or the video stream is directly and separately controlled at block 718. If the cell does include portions of both the background image pattern ring and the video stream, a uniformity compensation is adjusted within the cell at block 720. At block 722 the background image pattern ring and the video stream are provided to a display device and the flow ends at block 724.

Figure 8:
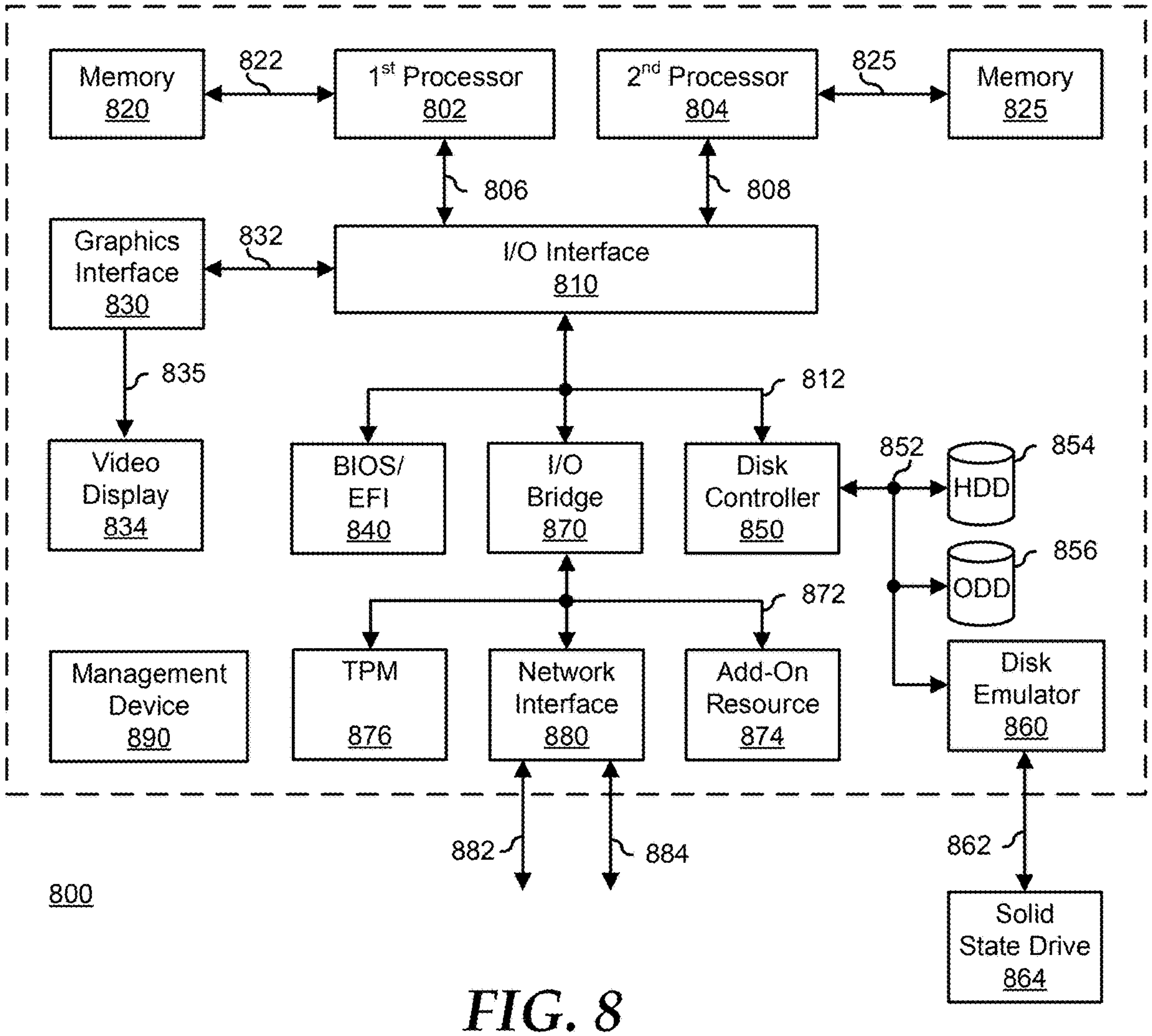
FIG. 8 is a block diagram of a general information handling system according to an embodiment of the present disclosure.

FIG. 8 shows a generalized embodiment of an information handling system 800 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 800 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 800 can include processing resources for executing machine-executable code, such as a central processing unit (CPU), a programmable logic array (PLA), an embedded device such as a System-on-a-Chip (SoC), or other control logic hardware. Information handling system 800 can also include one or more computer-readable medium for storing machine-executable code, such as software or data. Additional components of information handling system 800 can include one or more storage devices that can store machine-executable code, one or more communications ports for communicating with external devices, and various input and output (I/O) devices, such as a keyboard, a mouse, and a video display. Information handling system 800 can also include one or more buses operable to transmit information between the various hardware components.

Information handling system 800 can include devices or modules that embody one or more of the devices or modules described below and operates to perform one or more of the methods described below. Information handling system 800 includes a processors 802 and 804, an input/output (I/O) interface 810, memories 820 and 825, a graphics interface 830, a basic input and output system/universal extensible firmware interface (BIOS/UEFI) module 840, a disk controller 850, a hard disk drive (HDD) 854, an optical disk drive (ODD) 856, a disk emulator 860 connected to an external solid state drive (SSD) 862, an I/O bridge 870, one or more add-on resources 874, a trusted platform module (TPM) 876, a network interface 880, a management device 890, and a power supply 895. Processors 802 and 804, I/O interface 810, memory 820, graphics interface 830, BIOS/UEFI module 840, disk controller 850, HDD 854, ODD 856, disk emulator 860, SSD 862, I/O bridge 870, add-on resources 874, TPM 876, and network interface 880 operate together to provide a host environment of information handling system 800 that operates to provide the data processing functionality of the information handling system. The host environment operates to execute machine-executable code, including platform BIOS/UEFI code, device firmware, operating system code, applications, programs, and the like, to perform the data processing tasks associated with information handling system 800.

In the host environment, processor 802 is connected to I/O interface 810 via processor interface 806, and processor 804 is connected to the I/O interface via processor interface 808. Memory 820 is connected to processor 802 via a memory interface 822. Memory 825 is connected to processor 804 via a memory interface 827. Graphics interface 830 is connected to I/O interface 810 via a graphics interface 832 and provides a video display output 836 to a video display 834. In a particular embodiment, information handling system 800 includes separate memories that are dedicated to each of processors 802 and 804 via separate memory interfaces. An example of memories 820 and 830 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 840, disk controller 850, and I/O bridge 870 are connected to I/O interface 810 via an I/O channel 812. An example of I/O channel 812 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 810 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 840 includes BIOS/UEFI code operable to detect resources within information handling system 800, to provide drivers for the resources, initialize the resources, and access the resources. BIOS/UEFI module 840 includes code that operates to detect resources within information handling system 800, to provide drivers for the resources, to initialize the resources, and to access the resources.

Disk controller 850 includes a disk interface 852 that connects the disk controller to HDD 854, to ODD 856, and to disk emulator 860. An example of disk interface 852 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 860 permits SSD 864 to be connected to information handling system 800 via an external interface 862. An example of external interface 862 includes a USB interface, an IEEE 4394 (Firewire) interface, a proprietary interface, or a combination thereof. Alternatively, solid-state drive 864 can be disposed within information handling system 800.

I/O bridge 870 includes a peripheral interface 872 that connects the I/O bridge to add-on resource 874, to TPM 876, and to network interface 880. Peripheral interface 872 can be the same type of interface as I/O channel 812 or can be a different type of interface. As such, I/O bridge 870 extends the capacity of I/O channel 812 when peripheral interface 872 and the I/O channel are of the same type, and the I/O bridge translates information from a format suitable to the I/O channel to a format suitable to the peripheral channel 872 when they are of a different type. Add-on resource 874 can include a data storage system, an additional graphics interface, a network interface card (NIC), a sound/video processing card, another add-on resource, or a combination thereof. Add-on resource 874 can be on a main circuit board, on separate circuit board or add-in card disposed within information handling system 800, a device that is external to the information handling system, or a combination thereof.

Network interface 880 represents a NIC disposed within information handling system 800, on a main circuit board of the information handling system, integrated onto another component such as I/O interface 810, in another suitable location, or a combination thereof. Network interface device 880 includes network channels 882 and 884 that provide interfaces to devices that are external to information handling system 800. In a particular embodiment, network channels 882 and 884 are of a different type than peripheral channel 872 and network interface 880 translates information from a format suitable to the peripheral channel to a format suitable to external devices. An example of network channels 882 and 884 includes InfiniBand channels, Fibre Channel channels, Gigabit Ethernet channels, proprietary channel architectures, or a combination thereof. Network channels 882 and 884 can be connected to external network resources (not illustrated). The network resource can include another information handling system, a data storage system, another network, a grid management system, another suitable resource, or a combination thereof.

Management device 890 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 800. In particular, management device 890 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 800, such as system cooling fans and power supplies. Management device 890 can include a network connection to an external management system, and the management device can communicate with the management system to report status information for information handling system 800, to receive BIOS/UEFI or system firmware updates, or to perform other task for managing and controlling the operation of information handling system 800.

Management device 890 can operate off of a separate power plane from the components of the host environment so that the management device receives power to manage information handling system 800 when the information handling system is otherwise shut down. An example of management device 890 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 890 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:

a camera to capture images to form a video stream; and a display controller to communicate with the camera, the display controller includes first and second channel video processing paths, the display controller to:

output a background image pattern, wherein a color temperature and brightness of the background image pattern are set to defined levels;

receive the video stream from the camera;

adjust properties of the video stream via the first channel video processing path, wherein the background image pattern is bypassed around both of the first and second channel video processing paths; and output the video stream as an overlay to the background image pattern, wherein the video stream and the background image pattern are separate streams, wherein a luminance of the video stream is controlled independent from the color temperature and brightness of the background image pattern.

2. The information handling system of claim 1, wherein prior to video stream being provided as the overlay, the display controller further to:

receive a video stream size indication from a graphical user interface input; and based on the video stream size indication, adjust a display size of the video stream.

3. The information handling system of claim 1, wherein the display controller further to:

receive a background image pattern brightness level request from a graphical user interface input; and based on the background image pattern brightness level request, adjust a brightness level for the background image pattern.

4. The information handling system of claim 1, further comprising:

a local dimming control circuit;

wherein the display controller further to:

determine whether the video stream and the background image pattern overlap within one or more cells of a backlight matrix; and in response to the video stream and the background image pattern not overlapping, enable the local dimming control circuit to independently and directly dim an area of the backlight matrix associated with a location of the video stream.

5. The information handling system of claim 4, wherein in response to the video stream and the background image pattern overlapping within one or more cells, enable the local dimming control circuit to adjust a uniformity compensation gain of within the one or more cells based on a maximum luminance of the video stream and a maximum luminance of the background image pattern.

6. The information handling system of claim 1, wherein the video stream is displayed as a picture-in-picture video on the background image pattern.

7. A method comprising:

capturing, via a camera of an information handling system, image to form a video stream;

outputting, via a display controller of the information handling system, a background image pattern, wherein a color temperature of the background image pattern is set to a defined level;

receiving the video stream from the camera;

outputting the video stream as an overlay to the background image pattern, wherein the video stream and the background image pattern are separate streams, wherein a luminance of the video stream is controlled independent from the color temperature of the background image pattern;

determining whether the video stream and the background image pattern overlap within one or more cells of a backlight matrix; and in response to the video stream and the background image pattern not overlapping, directly dimming an area of the backlight matrix associated with a location of the video stream.

8. The method of claim 7, wherein the display controller includes first and second channel video processing paths.

9. The method of claim 8, further comprising: adjusting properties of the video stream via the first channel video processing path prior to the video stream being output, wherein the background image pattern is bypassed around both of the first and second channel video processing paths.

10. The method of claim 7, wherein prior to video stream being provided as the overlay, the method further comprising:

receiving a video stream size indication from a graphical user interface input; and based on the video stream size indication, adjusting a display size of the video stream.

11. The method of claim 7, further comprising:

receiving a background image pattern brightness level request from a graphical user interface input; and based on the background image pattern brightness level request, adjusting a brightness level for the background image pattern.

12. The method of claim 7, further comprising: in response to the video stream and the background image pattern overlapping within one or more cells, adjusting a uniformity compensation gain of within the one or more cells based on a maximum luminance of the video stream and a maximum luminance of the background image pattern.

13. The method of claim 7, wherein the video stream is displayed as a picture-in-picture video on the background image pattern.

14. An information handling system comprising:

a camera to capture images to form a video stream;

a display controller to communicate with the camera, the display controller to:

output a background image pattern, wherein a color temperature of the background image pattern is set to a defined level;

receive the video stream from the camera;

receive a video stream size indication from a graphical user interface input;

based on the video stream size indication, adjust a display size of the video stream;

output the video stream as an overlay to the background image pattern, wherein the video stream and the background image pattern are separate streams, wherein a luminance of the video stream is controlled independent from the color temperature of the background image pattern; and based on the video stream and the background image pattern overlapping within one or more cells, adjust a uniformity compensation gain within the one or more cells based on a maximum luminance of the video stream and a maximum luminance of the background image pattern; and a local dimming control circuit to:

based on a determination that the video stream and the background image pattern do not overlap within the one or more cells of a backlight matrix, directly dim an area of the backlight matrix associated with a location of the video stream.

15. The information handling system of claim 14, wherein the display controller includes first and second channel video processing paths.

16. The information handling system of claim 15, wherein the display controller further to: adjust properties of the video stream via the first channel video processing path prior to the video stream being output, wherein the background image pattern is bypassed around both of the first and second channel video processing paths.

17. The information handling system of claim 14, wherein the display controller further to:

receive a background image pattern brightness level request from a graphical user interface input; and based on the background image pattern brightness level request, adjust a brightness level for the background image pattern.

* * * * *